(12) United States Patent
Dunn et al.

(10) Patent No.: US 12,183,905 B2
(45) Date of Patent: Dec. 31, 2024

(54) BATTERY THERMAL MANAGEMENT STRIP

(71) Applicant: Electric Power Systems, Inc., North Logan, UT (US)

(72) Inventors: Randy Dunn, Orange, CA (US); James Barnwell, Montclair, CA (US)

(73) Assignee: Electric Power Systems, Inc., North Logan, UT (US)

( * ) Notice: Subject to any disclaimer, the term of this patent is extended or adjusted under 35 U.S.C. 154(b) by 664 days.

(21) Appl. No.: 17/608,122

(22) PCT Filed: May 1, 2020

(86) PCT No.: PCT/US2020/031122
§ 371 (c)(1),
(2) Date: Nov. 1, 2021

(87) PCT Pub. No.: WO2020/223676
PCT Pub. Date: Nov. 5, 2020

(65) Prior Publication Data
US 2022/0238936 A1    Jul. 28, 2022

Related U.S. Application Data

(60) Provisional application No. 62/841,400, filed on May 1, 2019.

(51) Int. Cl.
*H01M 10/653* (2014.01)
*H01M 10/643* (2014.01)
*H01M 10/6551* (2014.01)

(52) U.S. Cl.
CPC ....... *H01M 10/653* (2015.04); *H01M 10/643* (2015.04); *H01M 10/6551* (2015.04)

(58) Field of Classification Search
CPC ............. H01M 10/653; H01M 10/643; H01M 10/6551; Y02E 60/10
See application file for complete search history.

(56) References Cited

U.S. PATENT DOCUMENTS

| 7,291,420 B2 * | 11/2007 | Bitsche | H01M 50/262 |
| | | | 429/120 |
| 7,433,794 B1 * | 10/2008 | Berdichevsky | B60L 58/22 |
| | | | 320/150 |
| 9,397,376 B2 | 7/2016 | Rawlinson et al. | |
| 9,905,821 B2 | 2/2018 | Eberhard et al. | |
| 2007/0202531 A1 * | 8/2007 | Grover | B01L 3/5027 |
| | | | 435/287.2 |
| 2010/0100266 A1 | 4/2010 | Yoshinori et al. | |
| 2021/0380001 A1 * | 12/2021 | Hörder | B60L 50/64 |

FOREIGN PATENT DOCUMENTS

CN   106784518   5/2017

OTHER PUBLICATIONS

Notification of Transmittal of the International Search Report and Written Opinion dated Jul. 9, 2020 in PCT International Patent Application No. PCT/US2020/031122.

* cited by examiner

*Primary Examiner* — Muhammad S Siddiquee
(74) *Attorney, Agent, or Firm* — Snell & Wilmer L.L.P

(57) ABSTRACT

A system and method for a safe and reliable high voltage battery module is disclosed. A weight and cost efficient structure to connect a plurality of cell-brick assemblies in series and/or parallel and protect against a thermal runaway event, resulting in improved manufacturability and reliability.

15 Claims, 12 Drawing Sheets

BATTERY THERMAL MANAGEMENT STRIP

CROSS REFERENCE TO RELATED APPLICATIONS

This application is a U.S. national stage entry under 35 U.S.C. § 371 of International Application No. PCT/US2020/031122 filed May 1, 2020 entitled "BATTERY THERMAL MANAGEMENT STRIP", which claims priority to, and the benefit of, U.S. Provisional Patent Application Ser. No. 62/841,400, filed on May 1, 2019 and entitled "BATTERY THERMAL MANAGEMENT STRIP," which are incorporated by reference herein in its entirety.

FIELD OF INVENTION

The present disclosure generally relates to apparatus, systems and methods for providing a thermal management system for use in a cell assembly of a battery module assembly.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

A battery module, for purposes of this disclosure, includes a plurality of electrically connected cell-brick assemblies. These cell-brick assemblies may, in turn, include a parallel, series, or combination of both, collection of electrochemical or electrostatic cells hereafter referred to collectively as "cells", that can be charged electrically to provide a static potential for power or released electrical charge when needed. When cells are assembled into a battery module, the cells are often linked together through metal strips, straps, wires, bus bars, etc., that are welded, soldered, or otherwise fastened to each cell to link them together in the desired configuration.

A cell may be comprised of at least one positive electrode and at least one negative electrode. One common form of such a cell is the well-known secondary cells packaged in a cylindrical metal can, a pouch cell, or in a prismatic case. Examples of chemistry used in such secondary cells are lithium cobalt oxide, lithium manganese, lithium iron phosphate, nickel cadmium, nickel zinc, and nickel metal hydride. Such cells are mass produced, driven by an ever-increasing consumer market that demands low cost rechargeable energy for portable electronics.

Failure modes of such cells include an exothermic event, also known as thermal runaway. Thermal runaway increases risk in the use of such cells in certain applications, such as onboard aircraft, vehicles, or in medical applications. Common causes of thermal runaway include over charge, external short circuit, or internal short circuits. Over charge and external short circuits can be prevented by use of battery management systems, fuses, and over voltage disconnect devices. However, such devices are ineffective at preventing internal short circuits since there is no practical way to stop shorts across the substantially large anode to cathode interface internal to the cell. Positive thermal coefficient devices are sometimes installed inside cells for convenience and improved security but are still unable to stop anode to cathode internal shorts since they reside outside of that circuit.

Due to the large number of cells in certain applications, the likelihood of a thermal runaway event and the potential for a thermal event to cascade to other cells within the battery is more apparent. Thus, it is desired to have a battery module that limits the damage in the event a cell experiences a thermal runaway event.

SUMMARY OF THE INVENTION

In an example embodiment, a cell-brick assembly for use in a battery module is disclose herein. The cell-brick assembly comprises a thermal management strip. The thermal management strip comprises a thermally conducive layer and an insulating layer. The insulating layer may be thermally insulating and/or electrically insulating. The thermal management strip is configured to contact at least a portion of each cell among a plurality of cells. The plurality of cells may be arranged in rows and columns. The thermal management strip may be configured to contact each cell in a row of cells from the plurality of cells. In an example embodiment, the thermal management strip may contact a portion of each cell in an entire cell-brick assembly. In an example embodiment, each row of cells may have its own thermal management strip. The thermal management strip may be configured to apportion heat among the plurality of cells in a row and/or among the entire cell-brick assembly. The heat may come from an external source, such as a heating device, or it may occur during operation via a thermal runaway event.

BRIEF DESCRIPTION OF THE DRAWINGS

A more complete understanding of the present disclosure may be derived by referring to the detailed description and claims when considered in connection with the Figures, wherein like reference numbers refer to similar elements throughout the Figures, and where:

DETAILED DESCRIPTION

Figure 1:
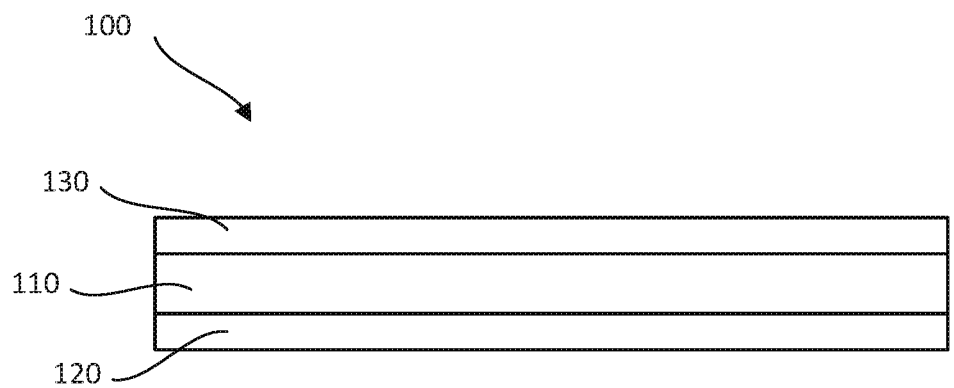
FIG. 1 illustrates a thermal management strip for use in a battery module, in accordance with an example embodiment.

The following description is of various example embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent example functional relationships and/or physical couplings between various elements. It should be noted that many alternative or additional functional relationships or physical connections may be present in a modular structure.

In an example embodiment, a battery module assembly may comprise a plurality of cells connected in series or parallel and a thermal management strip in contact with a portion of each cell in the plurality of cells. The thermal management strip may comprise a first insulating layer, a second insulating layer, and a thermally conductive material disposed between the first insulating layer and the second insulating layer. In an example embodiment, the thermal management strip may form a serpentine shape to maximize the contact of each cell in the plurality of cells.

The battery module may have a cell-brick assembly comprising M rows and N columns. Although disclosed herein with a battery module having a cell-brick assembly, a battery module comprising pouch cells is within the scope of this disclosure. For example, a thermal management strip may extend along a first side of a first pouch cell, between a second side of the first pouch cell and a first side of a second pouch cell, between a second side of the second pouch cell and a first side of a third pouch cell and so on. In this regard, it may be apparent to one skilled in the art various applications based on different sizes and configurations of cells in a battery module, and this application is not limited in this regard.

In an example embodiment, each row, or each column, may have a thermal management strip extending along the entire row and/or column, either in a serpentine shape or a linear line. In an example embodiment, at the end of each row the thermal management strip may connect to a thermally conductive component. The thermal management strips may be configured to ensure the cell-brick assembly shares the heat generated from a thermal runaway event among multiple cells, ensuring that the event does not propagate to other cells. By sharing the heat generated from a thermal runaway event over multiple cells, an adjacent cell to the cell experiencing thermal runaway may be prevented from overheating and experiencing a thermal runaway event itself.

A weight and cost efficient structure to connect a plurality of cell-brick assemblies in series and/or parallel is disclosed herein. A thermal management strip may help mitigate a thermal runaway event without the addition of a fluid, or other devices, which may reduce weight to comparative mitigating devices. A thermal management strip may protect against a thermal runaway event, resulting in improved manufacturability and reliability of cell-brick assemblies.

With reference now to FIG. 1, a thermal management strip 100, in accordance with various embodiments, is depicted. A thermal management strip 100 comprises a thermally conductive layer 110 and a first insulating layer 120. In an example embodiment, the thermal management strip 100 further comprises a second insulating layer 130. In an example embodiment, the thermally conductive layer 110 is disposed between the first insulating layer 120 and the second insulating layer 130. In various embodiments, the thermal management strip may only have a single insulating layer disposed on a single side of the thermal management strip. The thermally conductive layer 110 may be a sheet having a continuous thickness or a varying thickness. In an example embodiment, the sheet may be between 0.001" and 0.030" thick, preferably between 0.003" and 0.020", and more preferably between 0.005" and 0.015". In an example embodiment, the thermally conductive layer 110 is coupled to the first insulating layer 120 and the second insulating layer 130. The thermally conductive layer 110 may be coupled to the first insulating layer 120 and the second insulating layer 130 via an adhesive. In various embodiments, the adhesive may be made of a non-carbon producing adhesive, such as silicone adhesives and silicone sealants, preferably silicon conformal coat. Moreover, any suitable method of connection the thermally conductive layer 110 to the first insulating layer 120 and/or the second insulating layer 130 may be used. In an example embodiment, the thermally conductive layer 110, the first insulating layer 120, and the second insulating layer 130 are loose components and are not physically coupled together.

In various embodiments, the thermally conductive layer 110 is a thermally conductive metal, such as aluminum, tungsten, nickel, copper, beryllium, silver, gold, rhodium, silicon or any other thermally conductive metal known in the art. In an example embodiment, the thermally conductive metal comprises aluminum. In various embodiments, the thermally conductive layer 110 may comprise any thermally conductive material known in the art, such as a material with a thermal conductivity greater than $$50 \frac{W}{m*K}\left(\frac{BTU}{ft*hr*F}\right),$$

or preferably greater than $$100 \frac{W}{m*K}\left(\frac{BTU}{ft*hr*F}\right).$$

Moreover, any suitable thermally conductive material may be used for thermally conductive layer 110.

In various embodiments, the first insulating layer 120 may be made of a refractory material, such as alumina, silica, magnesia and mica, preferably aluminum oxide ceramic fiber insulation. In various embodiments, the second insulating layer 130 may be made of a refractory material, such as alumina, silica, magnesia and mica, preferably aluminum oxide ceramic fiber insulation. In an example embodiment, the first insulating layer 120 and the second insulating layer 130 are made of the same refractory material. In various embodiments, the first insulating layer 120 and the second insulating layer 130 are made of different refractory materials. The first insulating layer 120 may be electrically insulating and/or thermally insulating. Similarly, the second insulating layer 130 may be electrically insulating and/or thermally insulating. In various embodiments, the first insulating layer 120 may comprise any refractory material with a low thermal conductive, such as a material with a thermal conductivity between $$10 \frac{W}{m*K}\left(\frac{BTU}{ft*hr*F}\right),$$

or preferably greater than $$40 \frac{W}{m*K}\left(\frac{BTU}{ft*hr*F}\right),$$

or more preferably between $$10 \frac{W}{m*K}\left(\frac{BTU}{ft*hr*F}\right),$$

or preferably greater than $$30 \frac{W}{m*K}\left(\frac{BTU}{ft*hr*F}\right),$$

or approximately $$18 \frac{W}{m*K}\left(\frac{BTU}{ft*hr*F}\right)$$

for 94% aluminum oxide ceramic fiber insulation. Moreover, any suitable thermally insulative material may be used for first insulating layer 120. In various embodiments, the second insulating layer 130 may be in accordance with the first insulating layer 120.

The thermally conductive layer 110 may be configured to thermally heat and/or thermally cool a plurality of cells in a battery module. In an example embodiment, the thermal management strip 100 may apportion heat generated by a single cell from a thermal runaway event to a plurality of cells through the thermally conductive layer 110. In an example embodiment, the thermal management strip 100 may be configured to heat a plurality of cells through the thermally conductive layer 110.

In an example embodiment thermal management strip 100 may be disposed in a battery module. The thermal management strip 100 may provide one or more of the following benefits. The thermal management strip 100 may apportion heat from a thermal runaway event among a plurality of cells through the thermally conductive layer 110. The thermal management strip 100 may prevent a cascading effect promulgating a thermal runaway event to adjacent cells from an initial cell experiencing a thermal runaway event. The thermal management strip 100 may apportion heat from a cell that is relatively hotter than other cells amongst the plurality of cells. The thermal management strip 100 may apportion heat from a heating device through the thermally conductive layer 110 among the cells prior to use.

Figure 2:
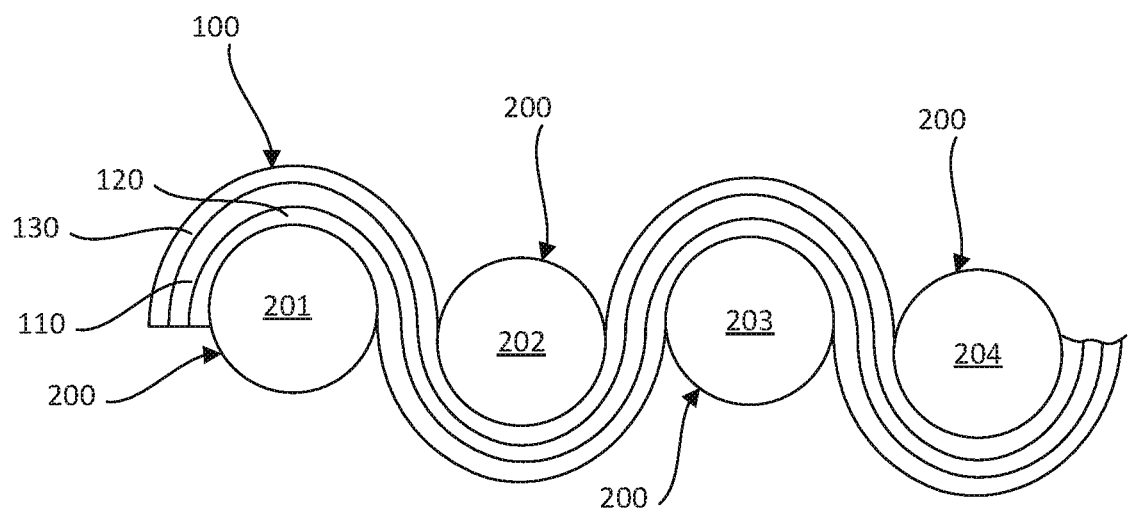
FIG. 2 illustrates a portion of a cell-brick assembly having a thermal management strip, in accordance with an example embodiment.

With reference now to FIG. 2, a portion of a cell-brick assembly having a thermal management strip 100, in accordance with various embodiments, is depicted. A cell-brick assembly comprises a plurality of cells 200. In an example embodiment, the plurality of cells 200 are disposed adjacent to one another forming a row of a cells in a cell-brick assembly. In another example embodiment, the plurality of cells 200 are disposed diagonally adjacent to one another. In an example embodiment, the thermal management strip is coupled to a heating device. The heating device may heat up the plurality of cells 200 when the cells are below a desirable operating temperature.

In various embodiments, a thermal management strip 100 is configured to contact a portion of first cell 201, a portion of second cell 202, a portion of third cell 203, and/or a portion of fourth cell 204. The thermal management strip 100 may be disposed around the plurality of cells 200 in a serpentine pattern. The serpentine pattern may ensure that a large surface area of each cell 200 is in contact with the thermal management strip 100. In various embodiments, a large surface area is between 30% and 70% of the surface area of cell 200, preferably 40% to 70%. In various embodiments, the thermal management strip 100 may have any of the following patterns: a linear shape; a honeycomb shape; a grid shape, or any other shape that may allow the thermal management strip to contact to a plurality of cells. With a honeycomb shape, the surface area of each cell 200 in contact with a honeycomb thermal management strip may be between 85% and 100%. However, a thermal management strip 100 with a serpentine shape may produce significant cost advantages over a honeycomb shape due to the complexity of manufacturing a honeycomb shape. In various embodiments, the thermal management strip 100 may loosely contact a portion of each cell in the plurality of cells 200. In various embodiments, the thermal management strip 100 may be adhesively coupled to a portion of each cell in the plurality of cell.

The first insulating layer 120 and/or the second insulating layer 130 may provide electrical insulation and thermal insulation from an adjacent plurality of cells. The first insulating layer 120 and/or the second insulating layer 130 may be configured to provide a more uniform apportionment of heat in a thermal runaway event or upon heating of the plurality of cells 200 prior to use. The first insulating layer 120 may allow heat to escape a cell experiencing thermal runaway. The heat may travel through the first insulating layer 120 to the thermally conductive layer 110. Due to the thermally conductive layer 110 having high thermal conductivity, the heat may travel long the thermally conductive layer 110 and be maintained in the thermally conductive layer 110 by the first insulating layer 120 and the second insulating layer 130.

By contacting a portion of each cell in the plurality of cells 200, the thermal management strip may be configured apportion heat among the plurality of cells 200. In an example embodiment, the thermal management strip 100 may apportion heat, generated from a thermal runaway event, from a first cell 201 in the plurality of cells 200 among a second cell 202, a third cell 203, and/or a fourth cell 204 to heat and/or cool the plurality of cells. In an example embodiment, the heating device may heat the plurality of cells 200 from a less efficient operation temperature to a more efficient temperature prior to use, the more efficient operation temperature corresponding to a greater output efficiency than at the less operation efficient temperature.

Figure 3:
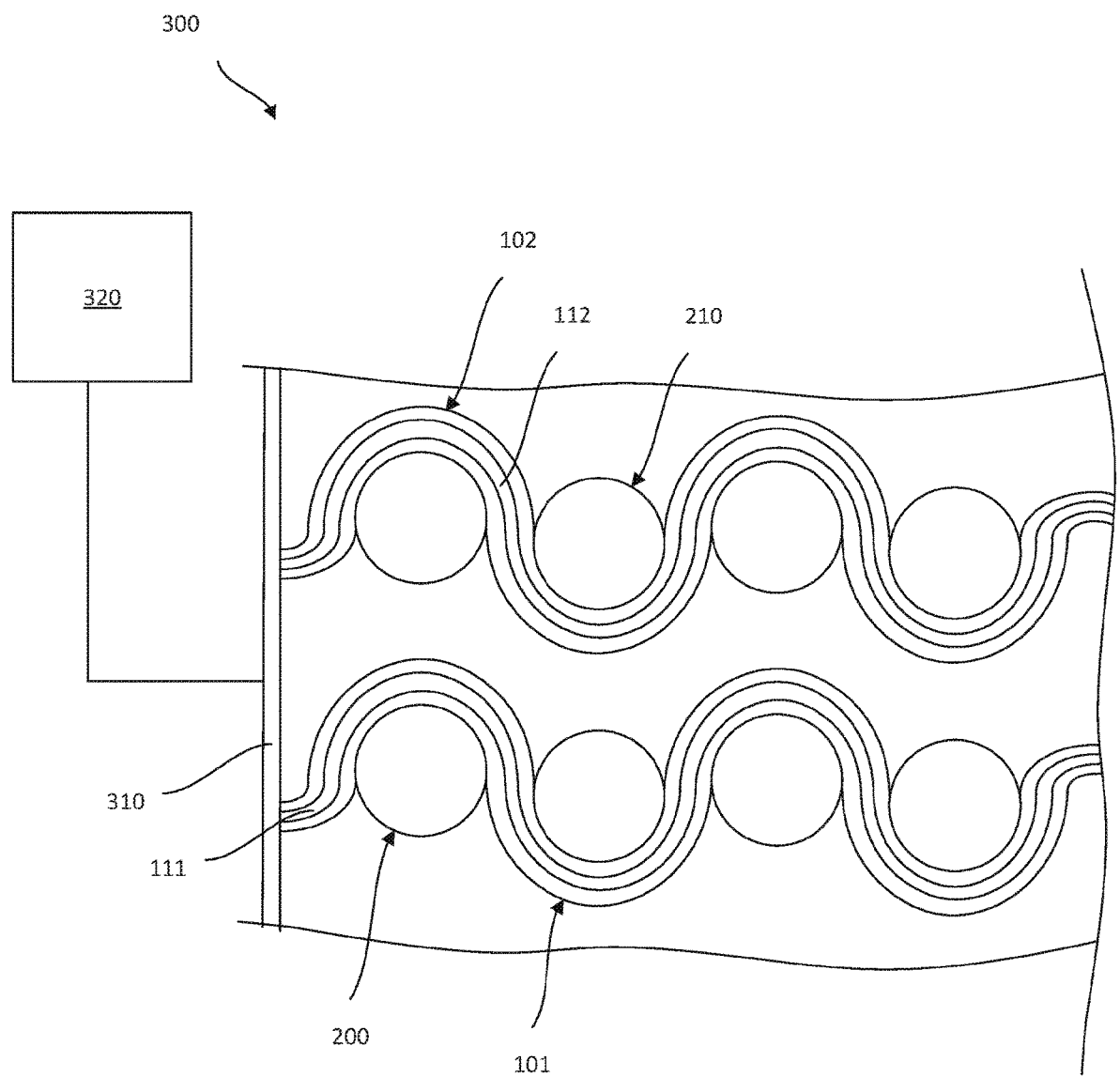
FIG. 3 illustrates a portion of a battery module assembly, in accordance with an example embodiment.

With reference now to FIG. 3, a portion of a battery module having a thermal management system, in accordance with various embodiments, is depicted. A battery module may comprise a first plurality of cells 200 forming a first row of the battery module 300, a second plurality of cells 210 forming a second row of the battery module, a first thermal management strip 101 disposed along the first plurality of cells 200, and a second thermal management strip 102 disposed along the second plurality of cells 210. The battery module 300 may further comprise a thermally conductive component 310 disposed at an end of each row of the first plurality of cells 200 and the second plurality of cells 210. In an example embodiment, the thermally conductive component 310 is coupled to the first thermally conductive layer 111 from the first thermal management strip 101 and the second thermally conductive layer 112 from the second thermal management strip 102. In an example embodiment, the thermally conductive component 310 is a housing for the battery module.

In various embodiments, the thermally conductive component 310 is coupled to a heating device 320. The heating device 320 may be a thin polyimide strip heater, or any other suitable heater known in the art. In various embodiments, a thermally conductive component 310 and a heating device 320 may be components of any battery module described herein (e.g., FIGS. 4-10).

In various embodiments, the heating device 320 may be configured to supply heat through the thermally conductive component 310 and along the first plurality of cells 200 via the first thermally conductive layer 111 of the first thermal management strip 101 and along the second plurality of cells 210 via the second thermally conductive layer 112 of the second thermal management strip 102. In various embodiments, if a cell in the first plurality of cells 200 experiences a thermal runaway event, the thermally conductive component 310 may be configured to apportion the heat generated from the thermal runaway event among the first plurality of cells 200 to the end of the respective row through the first thermally conductive layer 111, through the thermally conductive component 310, and to the adjacent plurality of cells 210 through the second thermally conductive layer 121. The thermally conductive component 310 may allow greater dispersion of heat generated from a single cell during a thermal runaway event by dispersing the heat over a greater number of cells.

Figure 4:
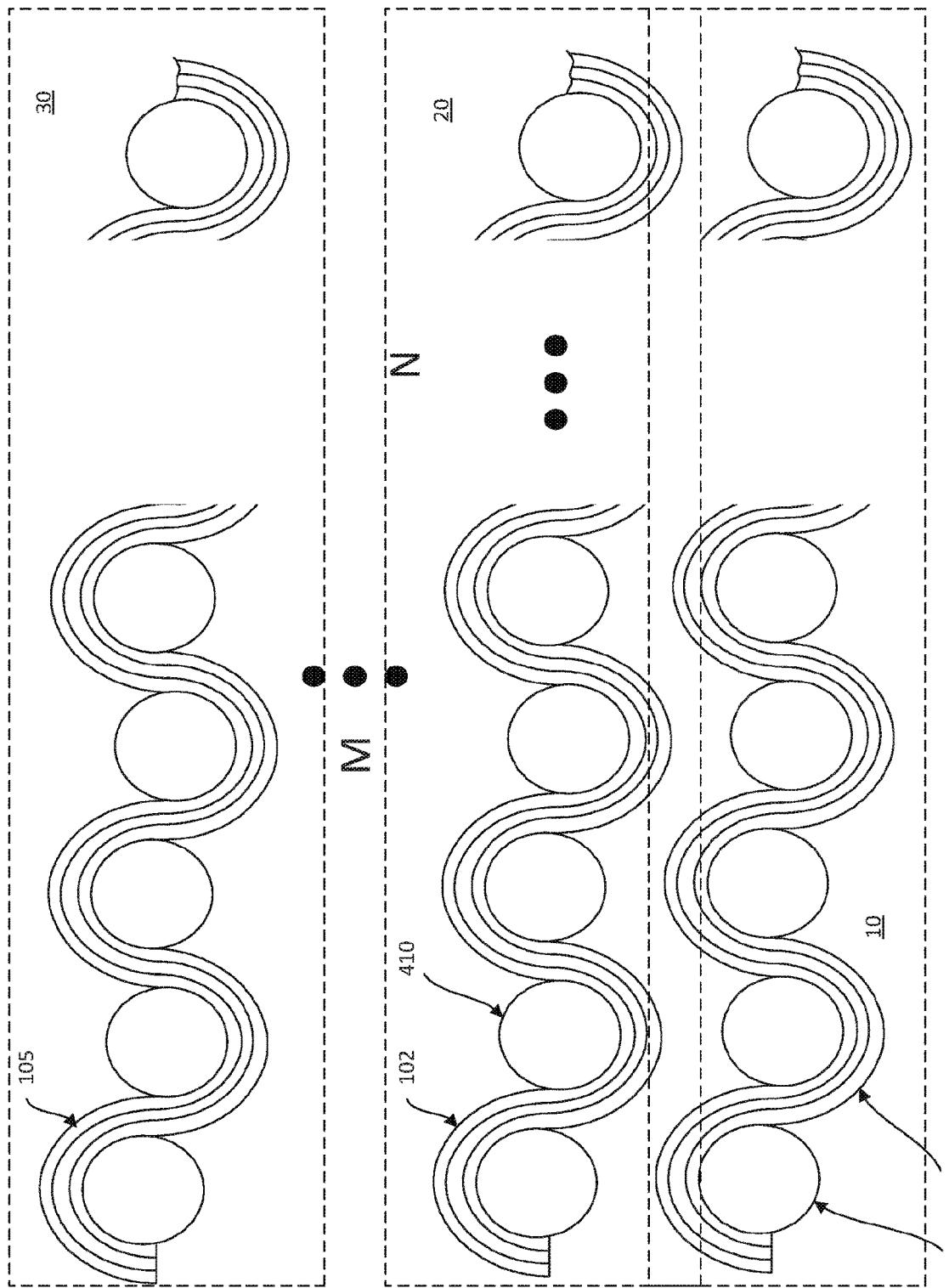
FIG. 4 illustrates a cell-brick assembly having M rows and N columns, in accordance with an example embodiment.

With reference now to FIG. 4, a cell-brick assembly having M rows and N columns, in accordance with an example embodiment, is depicted. In various embodiments, a cell-brick assembly may comprise a first plurality of cells 400 having N cells aligned adjacently to one another and forming a first row of cells 10, and a second plurality of cells 410 aligned adjacently to one another and forming a second row of cells 20. The second row of cells 20 may be aligned adjacent to the first row of cells 10. The cell-brick assembly may further comprise M rows of cells 30. Each row of cells (10, 20, 30) may have its own thermal management strip. For example, the first plurality of cells 400 may have a first thermal management strip 101 extending from the first cell in the first row of cells 10 to the Nth cell in the first row of cells 10. Similarly, the second plurality of cells 410 comprise a second thermal management strip 102 extending from the first cell in the second row of cells 20 to the Nth cell in the second row of cells 20. This structure may continue through the Mth row of cells where an Mth thermal management strip 105 may extend from the first cell in the Mth row of cells 30 to the Nth cell in the Mth row of cells.

In various embodiments, every cell in a cell-brick assembly is contacted by a thermal management strip from a plurality of thermal management strips (101, 102, 105). In other example embodiments, there could be a different number of cells per row, an array configuration, linear or otherwise. In various embodiments, a single thermal management strip may contact all cells in the cell-brick assembly, such as in a honeycomb or grid pattern. In another example embodiment, a single thermal management strip contacts all cells in a given row. In another example embodiment, a single thermal management strip contacts a portion of cells in a given row and is coupled to a second thermal management strip in that row.

Figure 5:
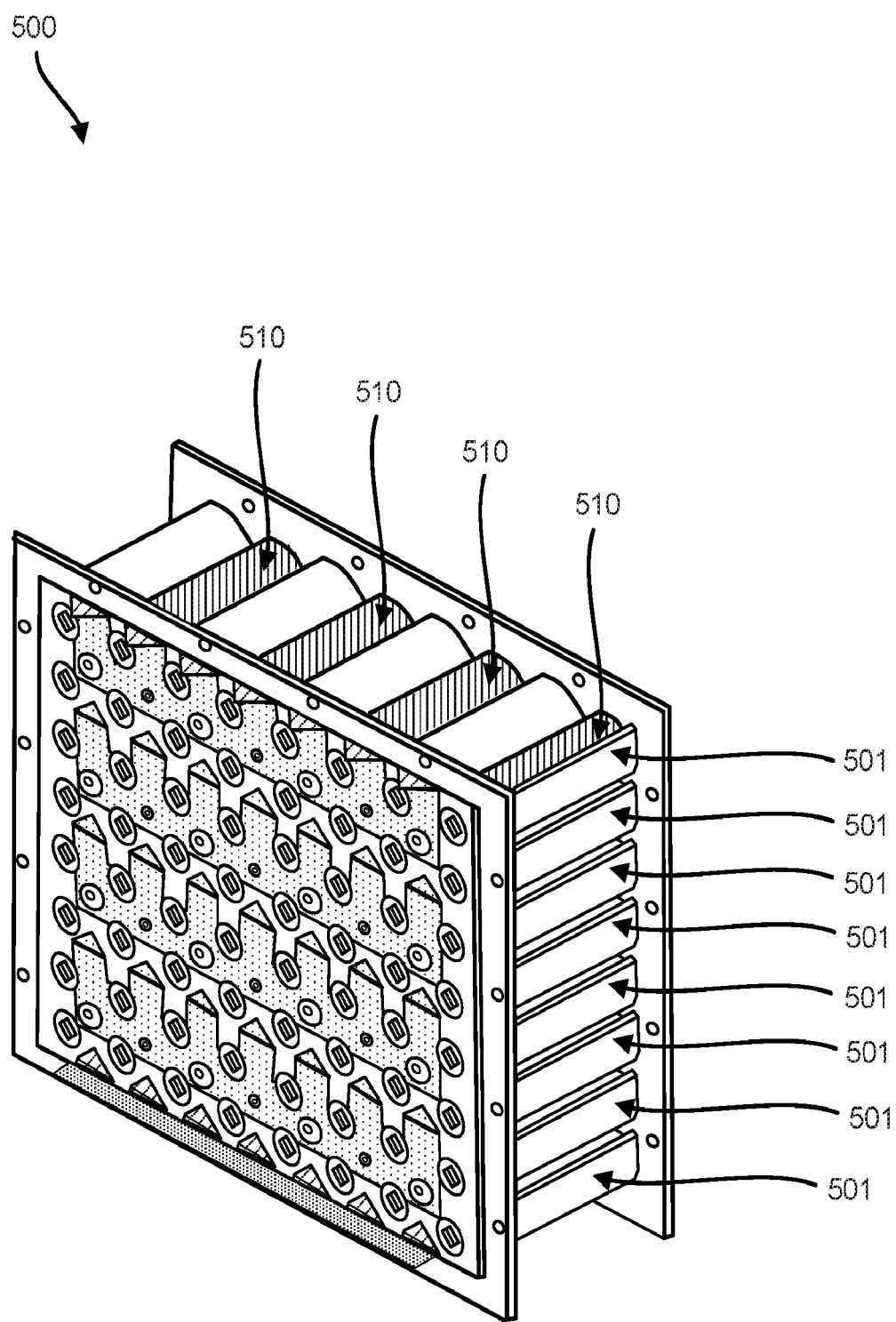
FIG. 5 illustrates a perspective view of a cell-brick assembly for use in a battery module, in accordance with an example embodiment.

With reference now to FIG. 5, a perspective view of a cell-brick assembly for use in a battery module, in accordance with an example embodiment is depicted. The cell-brick assembly 500 comprises a plurality of cells 510 and a plurality of thermal management strips 501. The plurality of thermal management strips 501 are in accordance with the thermal management strip 100 described previously. Each row of cells in the plurality of cells 510 comprises a discrete thermal management strip in the plurality of thermal management strips 501. Each thermal management strip in the plurality of thermal management strips 501 contacts a portion of each cell in a respective row of cells in the plurality of cells 510. As shown, the portion of each cell that is contacted is a side of the cylindrical portion of the cell in the plurality of cells 510.

If a cell in a row of cells in the plurality of cells 510 experiences a thermal runaway event, the heat generated from the event may be apportioned among the plurality of cells 510. Each thermal management strip in the plurality of thermal management strips 501 may be configured to ensure a thermal runaway event from a cell in a row of cells apportions the heat generated such that the thermal runaway event does not cascade to any adjacent cells of the cell experiencing the thermal runaway event.

Figure 6B:
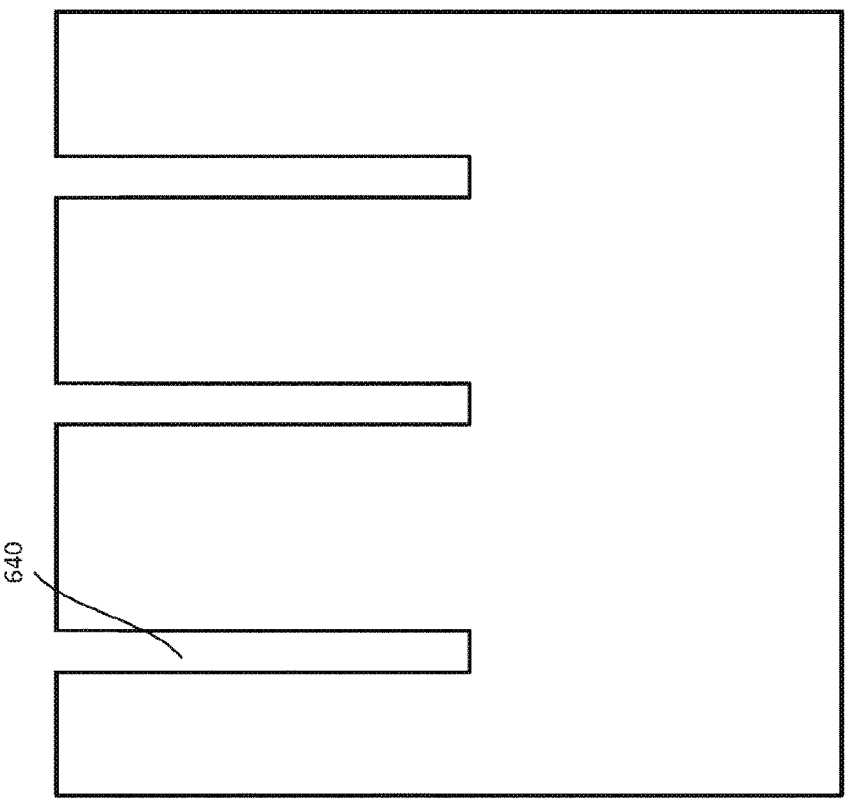
FIG. 6B illustrates a front view of thermal management strip, in accordance with an example embodiment.
Figure 6A:
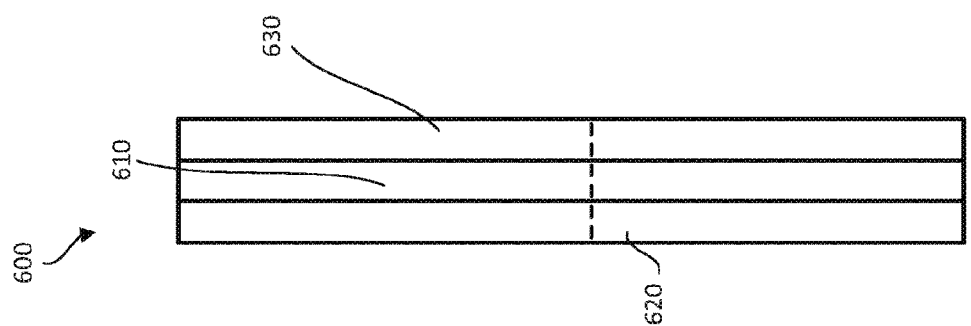
FIG. 6A illustrates a side view of thermal management strip, in accordance with an example embodiment.

Referring now to FIGS. 6A and 6B, a thermal management strip 600, in accordance with various embodiments, is depicted. FIG. 6A is a side view of thermal management strip 600, showing example layers forming the thermal management strip. The thermal management strip 600 comprises a thermally conductive layer 610, a first insulating layer 620, and a second insulating layer 630. In an example embodiment, the thermally conductive layer may be embedded in an insulating material. FIG. 6B is a top planar view of thermal management strip 600. In an example embodiment, the thermal management strip 600 comprises slots 640. The number of slots 640 in thermal management strip 600 may correspond to one less than the number of rows and/or the number of columns in a cell-brick assembly. For example, a 6×8 cell brick assembly would have thermal management strips 600 having 7 slot 640 for each row and thermal management strips 600 having 5 slots 640 for each column. The thermal management strip 600 is configured to receive another thermal management strip 600 in each slot 640. Thus, a grid formation of thermal management strips 600 may be formed by the slot and tab configuration.

Figure 7B:
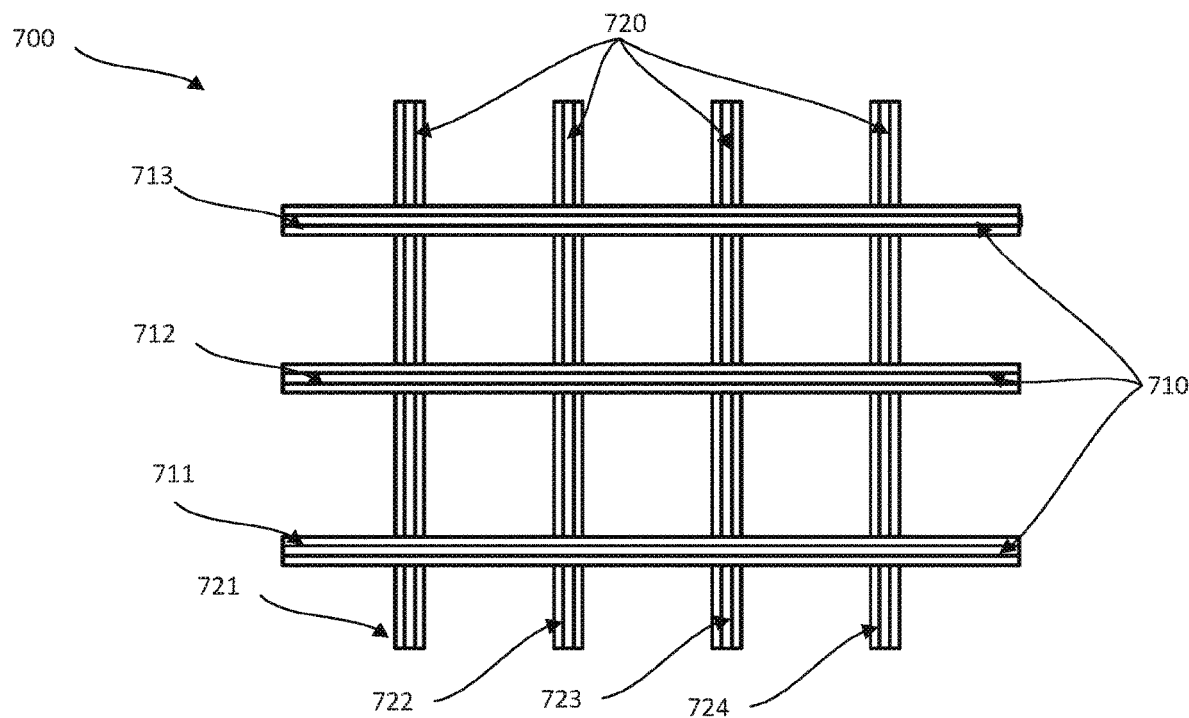
FIG. 7B illustrates a top view of a thermal management strip assembly, in accordance with an example embodiment.
Figure 7A:
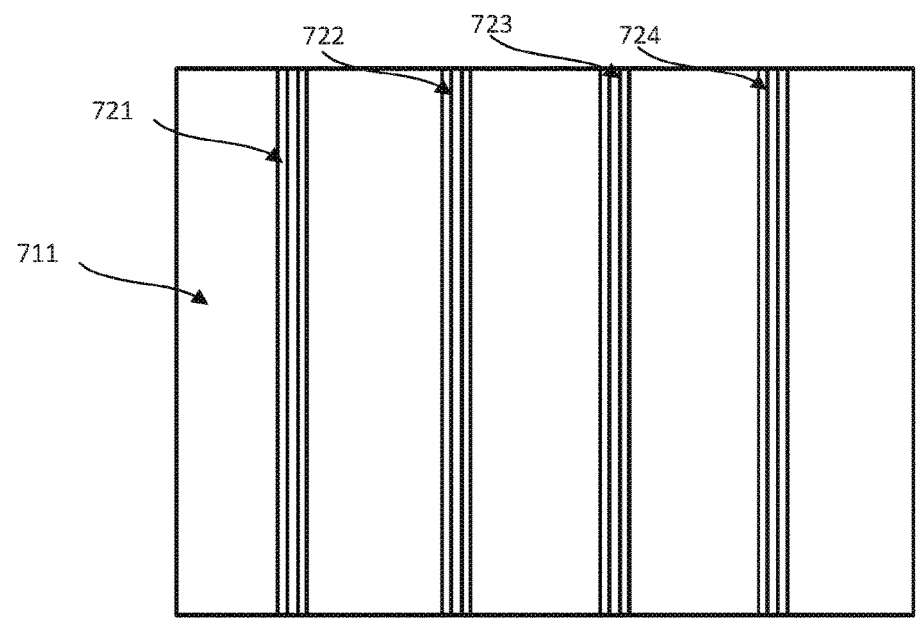
FIG. 7A illustrates a front view of a thermal management strip assembly, in accordance with an example embodiment.

Referring now to FIGS. 7A and 7B, a front view and a top view, respectively, of a thermal management strip assembly 700, in accordance with various embodiments, is depicted. The thermal management strip assembly 700 comprises a plurality of row thermal management strips 710 and a plurality of column thermal management strips 720. In an example embodiment, the number of thermal management strips corresponding to a given cell-brick assembly is two less than the total number of rows and columns in a cell-brick assembly. For example, a thermal management strip assembly 700 for a 4 row×5 column cell-brick assembly comprises a first row thermal management strip 711, a second row thermal management strip 712 disposed in an adjacent row to the first row thermal management strip 711, and a third row thermal management strip 713 disposed in an adjacent row to the second row thermal management strip 712. Similarly, the thermal management strip assembly 700 for a 4 row×5 column cell-brick assembly comprises a first column thermal management strip 721, a second column thermal management strip 722 disposed in an adjacent column to the first column thermal management strip 721, a third column thermal management strip 723 disposed in an adjacent column to the second column thermal management strip 722, and a fourth column thermal management strip 724 disposed in an adjacent column to the third column thermal management strip 723. In an example embodiment, the row and column thermal management strips intersect at right angles and are in slotted engagement with each other.

In various embodiments, a thermal management strip assembly 700 may thermally connect each thermally conductive layer of each thermal management strip 710 in the thermal management strip assembly. The thermal management strip assembly 700 is not limited in this regard. For example, in accordance with various embodiments, first row thermal managements strip 711 may interface with first column thermal management strip 721 at a slot interface (e.g., slot 640 from FIG. 6B interfacing with a complimentary slot), or part of the insulative layers may be removed at an interface between first row thermal management strip 711 and first column thermal management strip 721, or any other connection of thermally conductive layers between mating thermal management strips may be utilized.

Figure 8:
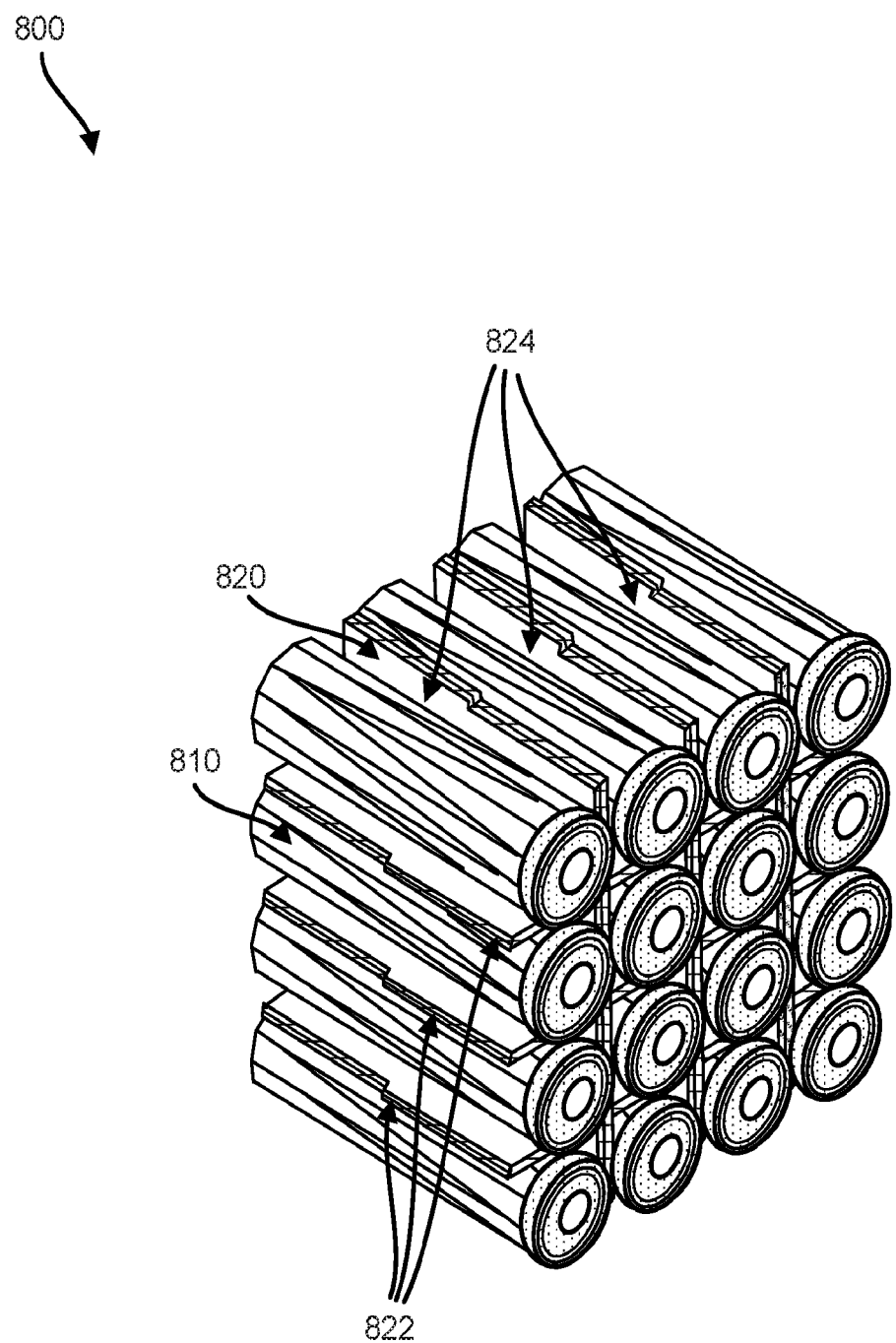
FIG. 8 illustrates a perspective view of a cell-brick assembly for use in a battery module, in accordance with an example embodiment.

With reference now to FIG. 8, a perspective view of a cell-brick assembly for use in a battery module, in accordance with an example embodiment is depicted. The cell-brick assembly 800 may comprise a plurality of cells 810 and a thermal management strip assembly 820. The thermal management strip assembly 820 comprises a plurality of row thermal management strips 822 and a plurality of column thermal management strips 824. The thermal management strip assembly 820 is in accordance with the thermal management strip assembly 700 described previously. Each cell is contacted at least by a portion of a row thermal management strip in the plurality of row thermal management strips 822 and a column thermal management strip in the plurality of column thermal management strips 824. As shown, the portion of each cell that is contacted is a side of the cylindrical portion of the cell in the plurality of cells 810. In an example embodiment, the thermal management strips (row and column) have no insulative layer at the point of slotted engagement of a row and column. Thus, the thermal management strip assembly 700 is configured to facilitate heat transfer between column and row thermal management strips.

If a cell in a row of cells from the plurality of cells 810 experiences a thermal runaway event, the heat generated from the event may be apportioned among the plurality of cells 810. The thermal management strip assembly 820 may be configured to ensure a thermal runaway event from a cell in a row of cells apportions the heat generated such that the thermal runaway event does not cascade to any adjacent cells of the cell experiencing the thermal runaway event.

In various embodiments, the thermal management strip assembly 820 may consist only of a thermally conductive strip, and each cell in the plurality of cells 810 may be wrapped with a insulative wrap as described further herein. In this regard, the plurality of the thermally management strips may rapidly dissipate any heat that penetrates the insulative wrap from a thermal runaway event amongst all the cells.

Figure 9:
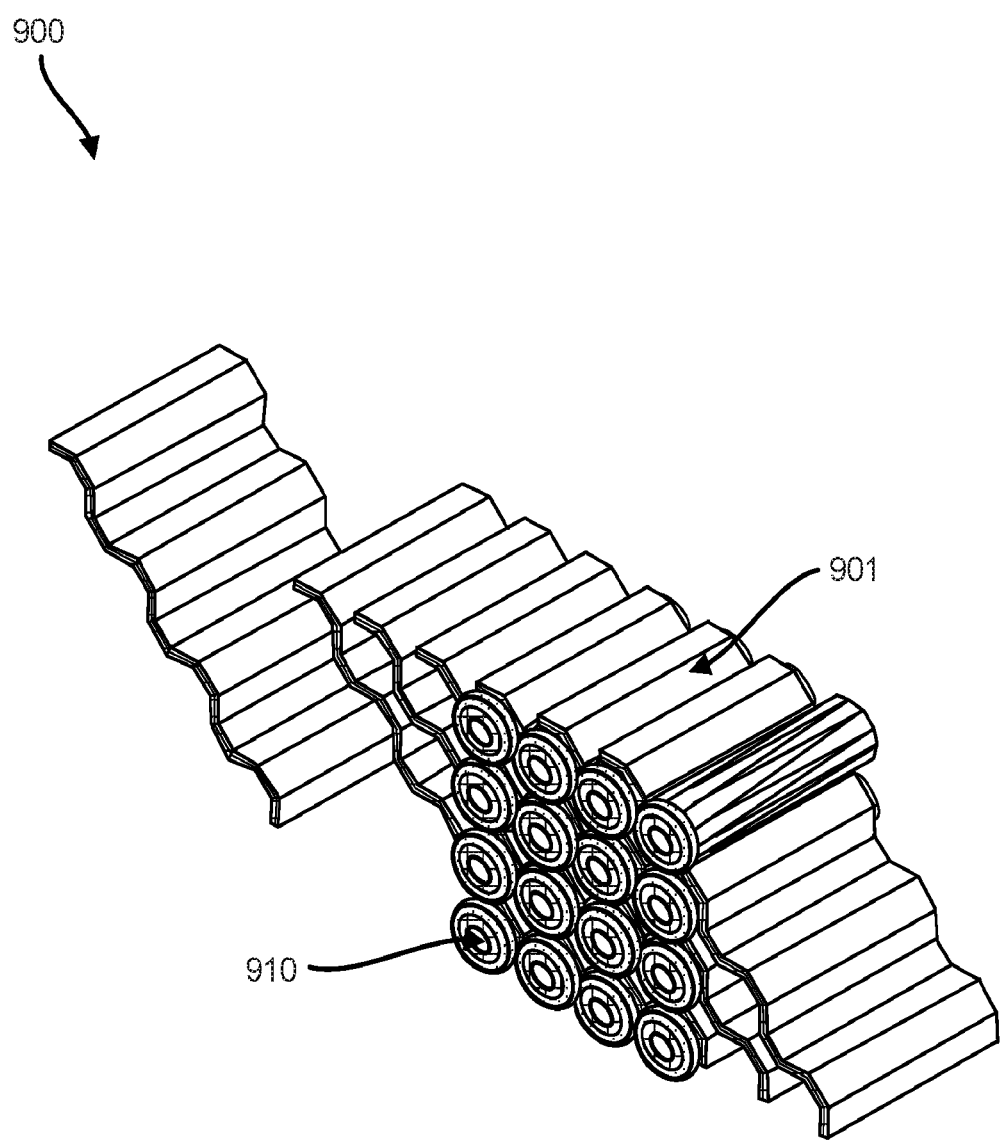
FIG. 9 illustrates a perspective view of a portion of a cell-brick assembly, in accordance with an example embodiment.

Referring now to FIG. 9, a perspective view of a portion of a cell-brick assembly, in accordance with various embodiments, is depicted. The portion of a cell-brick assembly 900 comprises a plurality of cells 910 and a plurality of thermal management strips 901. The plurality of thermal management strips 901 are in accordance with the thermal management strip 100 described previously. Each thermal management strip in the plurality of thermal management strips 901 may be oriented diagonally across the cell-brick assembly 900. Each thermal management strip in the plurality of thermal management strips 901 contacts a portion of each cell in a respective diagonal of cells in the plurality of cells 910. As shown, the portion of each cell that is contacted is a side of the cylindrical portion of the cell in the plurality of cells 910.

If a cell in a row of cells in the plurality of cells 910 experiences a thermal runaway event, the heat generated from the event may be apportioned among the plurality of cells 910. Each thermal management strip in the plurality of thermal management strips 901 may be configured to ensure a thermal runaway event from a cell in a diagonal of cells apportions the heat generated such that the thermal runaway event does not cascade to any adjacent cells of the cell experiencing the thermal runaway event.

In various embodiments, the plurality of thermal management strips 901 may consist only of a thermally conductive strip, and each cell in the plurality of cells 910 may be wrapped with a insulative wrap as described further herein. In this regard, the plurality of the thermally management strips may rapidly dissipate any heat that penetrates the insulative wrap from a thermal runaway event amongst all the cells.

Figure 10:
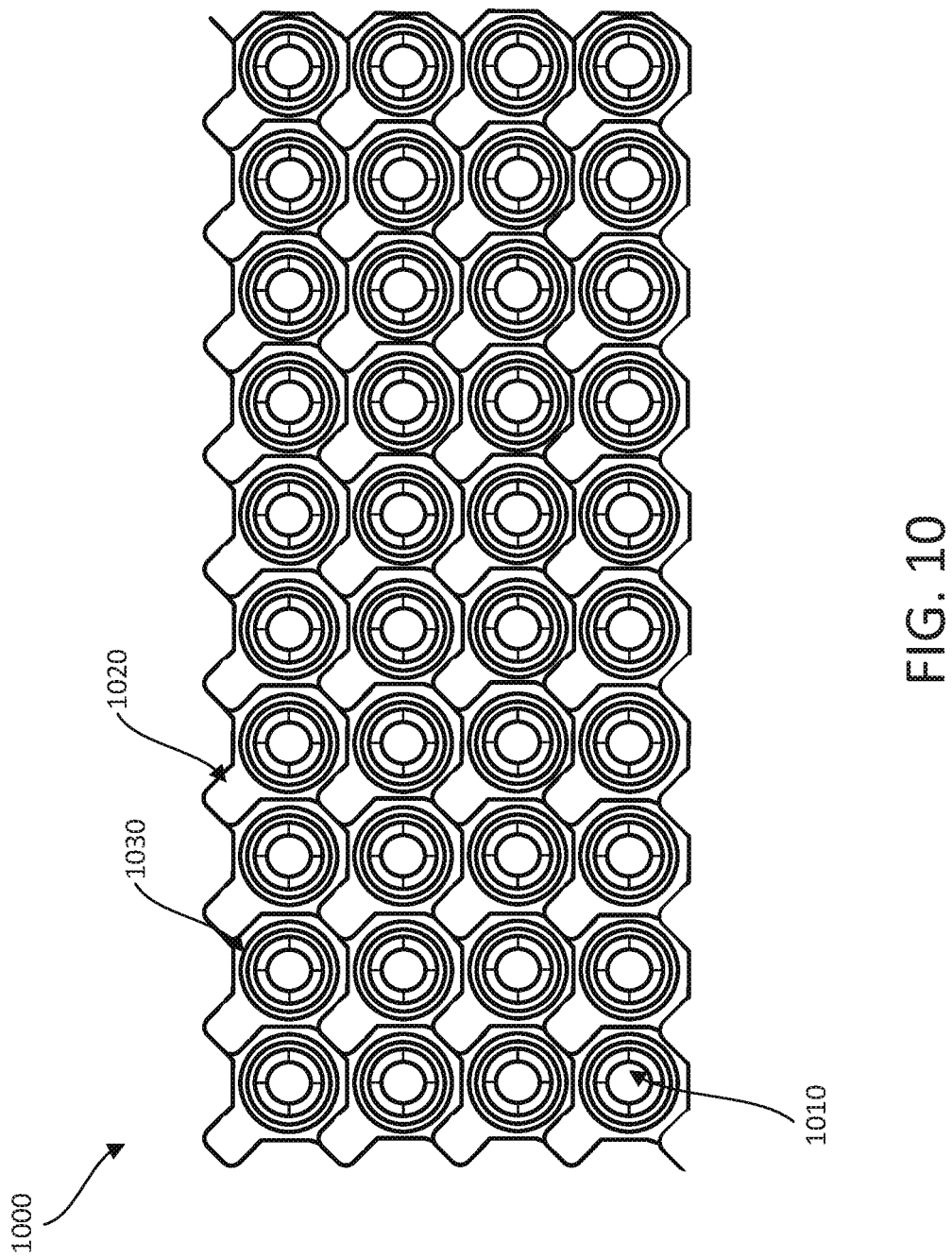
FIG. 10 illustrates a top view of a portion of a cell-brick assembly, in accordance with an example embodiment.

Referring now to FIG. 10, a top view of a portion of a cell-brick assembly, in accordance with various embodiments, is depicted. The cell-brick assembly 1000 comprises a plurality of cells 1010, a plurality of conductive strips 1020, and a plurality of insulative wraps 1030. In various embodiments, the plurality of conductive strips 1020 are a plurality of thermal management strips. Each conductive strip in the plurality of conductive strips 1020 may be arranged diagonally through the plurality of cells 1010. In this regard, the plurality of conductive strips 1020 may form a honeycomb structure through the cell-brick assembly 1000. In various embodiments, a honeycomb structure for a respective cell in the plurality of cells 1010 includes 3 sides from a first conductive strip in the plurality of conductive strips 1020 and 3 sides of a second conductive strip in the plurality of conductive strips 1020 all in contact with and coupled to an insulated wrap in the plurality of insulative wraps 1030. In various embodiments, the 3 sides from the first conductive strip and the 3 sides from the second conductive strip form a hexagonal cell in the honeycomb structure.

In various embodiments, each insulated wrap in the plurality of insulated wraps may be in accordance with the first insulated layer 120 and/or the second insulated layer 130 of the thermal management strip 100 from FIG. 1. Similarly, each conductive strip in the plurality of conductive strips 1020 may be in accordance with the conductive layer 110 of the thermal management strip 100 from FIG. 1. In this regard, in response to a thermal runaway event from a cell in the plurality of cells, the heat generated from the thermal runaway cell may dissipate through the insulated wrap of the thermal runaway cell and rapidly dissipate along a respective conductive strip in the plurality of conductive strip to each cell in contact with the respective conductive strip.

In various embodiments, the honeycomb structure may be configured to provide structural support to the plurality of cells 1010, as well as providing a thermal management benefit to the plurality of cells 1010 in the cell-brick assembly 1000. For example, the plurality of conductive strips 1020 may be coupled to sides of each insulative wrap in the plurality of insulative wraps 1030 via an adhesive or the like. Similarly, each wrap in the plurality of insulative wraps 1030 may be coupled to an outer surface of a respective cell in the plurality of cells 1010. Each insulative wrap in the plurality of insulative wraps 1030 may cover approximately 80%-100% of an outer surface of a respective cell in the plurality of cells, or more preferably approximately 100% of the outer surface. Additionally, the plurality of conductive strips 1020 may be coupled to a housing for the cell-brick assembly 1000. In this regard, the honeycomb structure of the plurality of conductive strips 1020 may provide the entire structural support for the cell-brick assembly 1000, in accordance with various embodiments.

Figure 11:
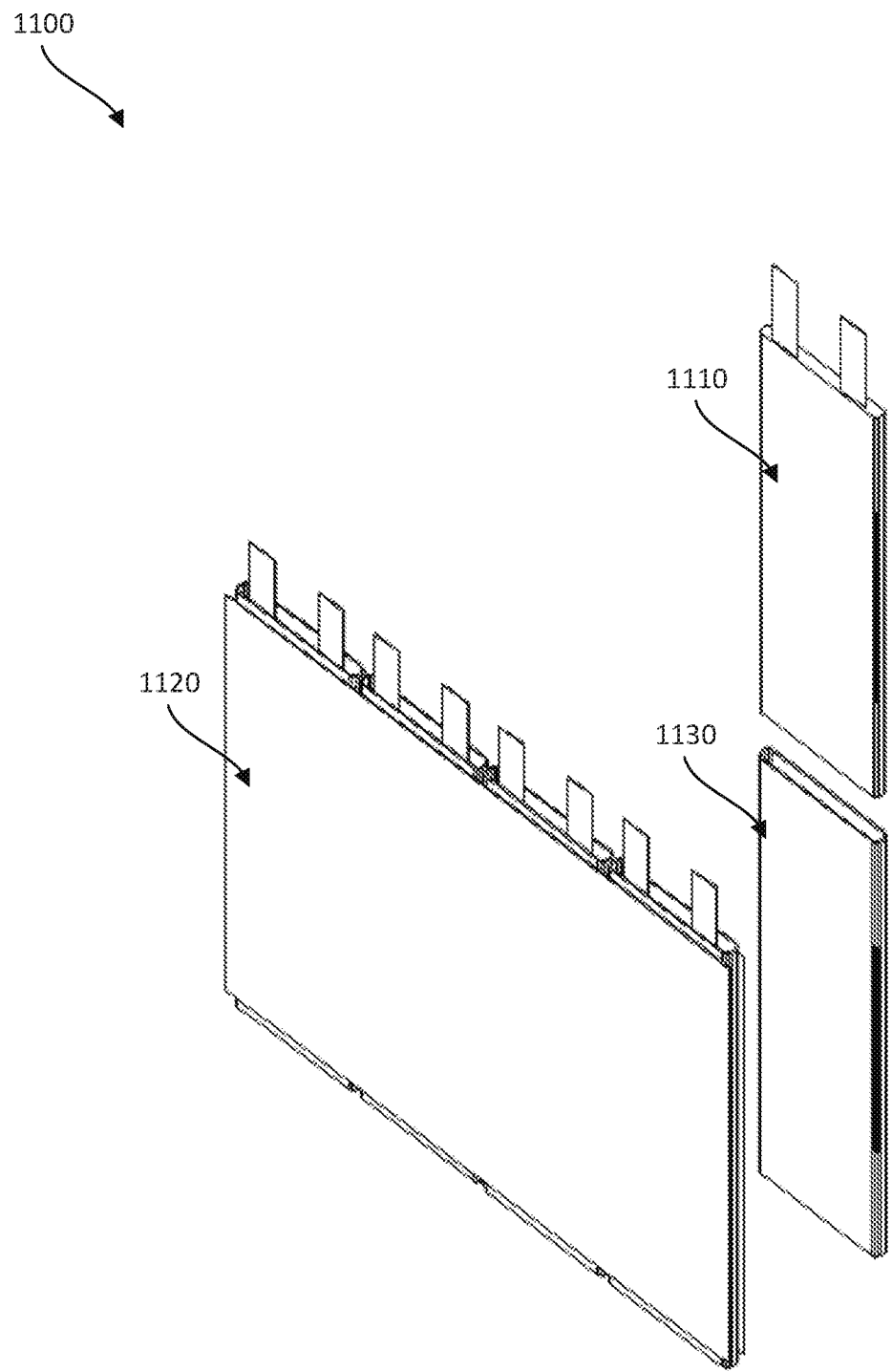
FIG. 11 illustrates a perspective view of a portion of a battery module, in accordance with an example embodiment.

Referring now to FIG. 11, a perspective view of portion of a battery module including a plurality of pouch cells is illustrated in accordance with various embodiments. The battery module 1100 includes a plurality of pouch cells 1110, at least one conductive strip 1120, and a plurality of insulative wraps 1130. Each cell in the plurality of pouch cells 1110 may be disposed in a respective wrap in the plurality of insulative wraps 1130. Each insulative wrap in the plurality of insulative wraps 1130 may insulate an outer surface of a respective pouch cell in the plurality of pouch cells. In various embodiments, each insulative wrap in the plurality of insulative wraps 1130 may be in accordance with the plurality of insulative wraps 1030 from FIG. 10. Similarly, the at least one conductive strip 1120 may be in accordance with the plurality of conductive strips 1020 from FIG. 10.

In various embodiments, the at least one conductive strip 1120 may be disposed along a row of pouch cells on a first side. In various embodiments, a second conductive strip may be disposed opposite the conductive strip 1120. The conductive strip 1120 may be coupled to the plurality of insulative wraps 1130 by any method known in the art, such as an adhesive, or the like.

Figure 12:
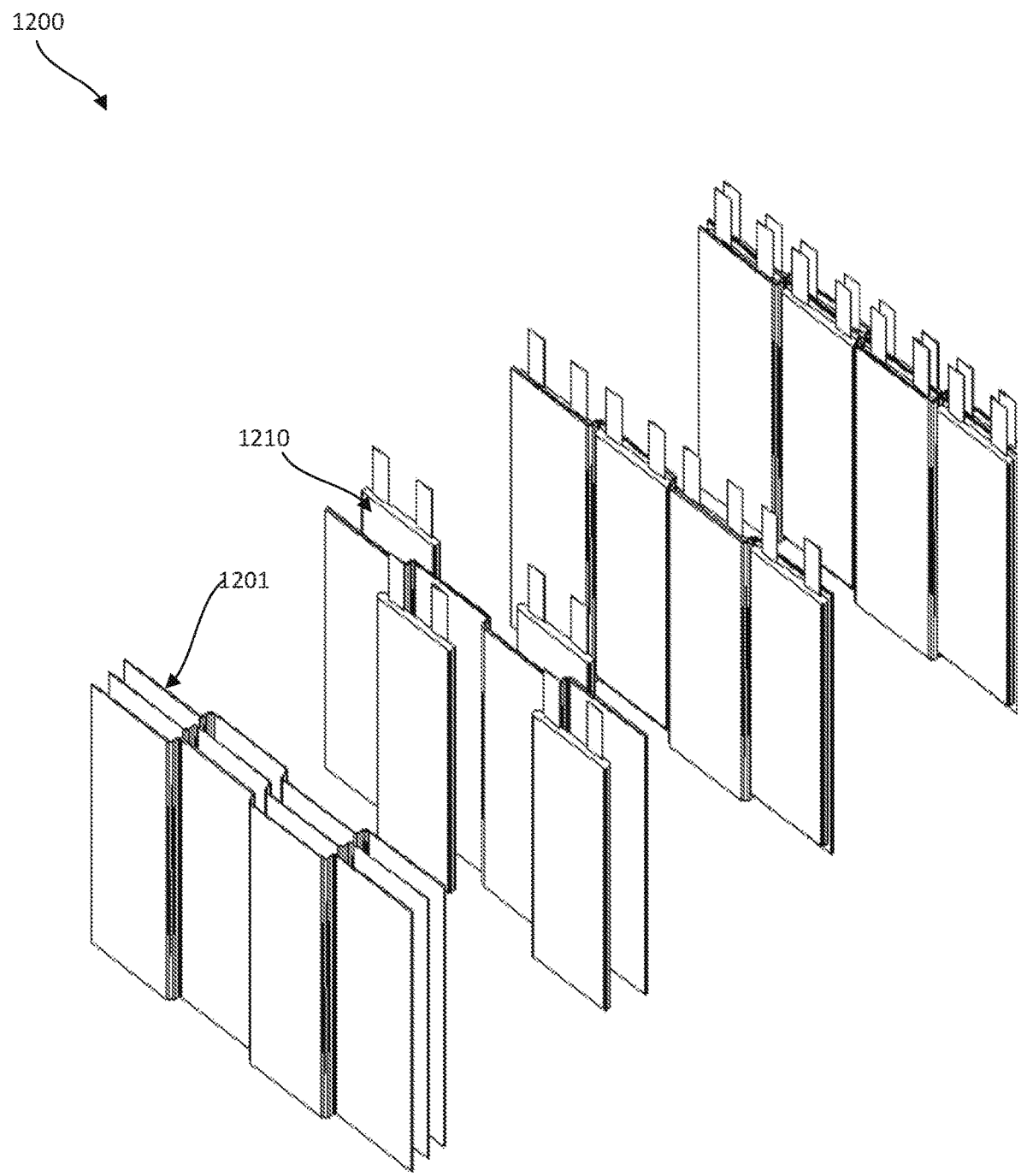
FIG. 12 illustrates a perspective view of a portion of a battery module, in accordance with an example embodiment.

Referring now to FIG. 12, a perspective view of portion of a battery module including a plurality of pouch cells is illustrated in accordance with various embodiments. The portion of a battery module 1200 comprises a plurality of pouch cells 1210 and a plurality of thermal management strips 1201. The plurality of thermal management strips 901 are in accordance with the thermal management strip 100 described previously. Each thermal management strip in the plurality of thermal management strips 1201 may be arranged in a serpentine type manner about a row of pouch cells in the plurality of pouch cells 1210. In this regard, a respective thermal management strip may contact a side of a first pouch cell on a first side of the row of pouch cells, then contact a side of a second pouch cell on a second side, then contact a side of a third pouch cell on the first side, and so on.

Each thermal management strip in the plurality of thermal management strips 1201 contacts a portion of each cell in a respective row of cells in the plurality of pouch cells 1210. As shown, the portion of each cell that is contacted is a flat side portion of the pouch cell in the plurality of pouch cells 1210.

If a cell in a row of cells in the plurality of pouch cells 1210 experiences a thermal runaway event, the heat generated from the event may be apportioned among the plurality of pouch cells 1210. Each thermal management strip in the plurality of thermal management strips 1201 may be configured to ensure a thermal runaway event from a cell apportions the heat generated along a respective thermal management strip in the plurality of thermal management strips 1201 to adjacent cells in the plurality of cells 1210 such that the thermal runaway event does not cascade to any adjacent cells of the cell experiencing the thermal runaway event.

In various embodiments, the plurality of thermal management strips 1201 may consist only of a thermally conductive strip, and each cell in the plurality of cells 1210 may be wrapped with an insulative wrap as described further herein. In this regard, the plurality of thermal management strips 1201 may rapidly dissipate any heat that penetrates the insulative wrap from a thermal runaway event amongst all the cells.

Figure 13:
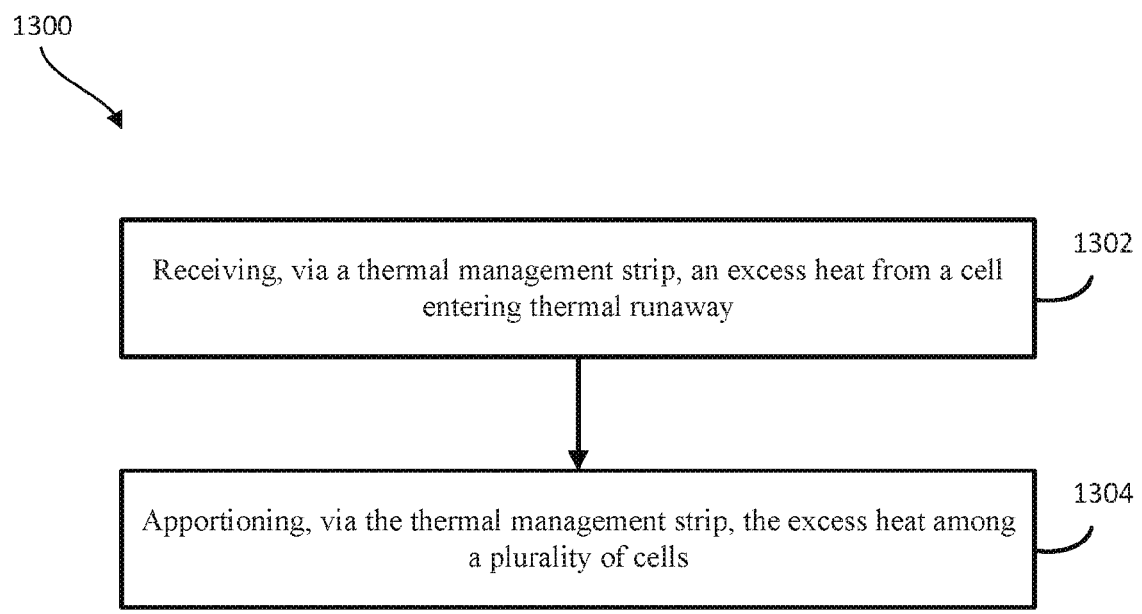
FIG. 13 illustrates a method of managing a thermal runaway event in a battery module via a thermal management strip, in accordance with an example embodiment.

Referring now to FIG. 13 a method 1300 of managing a thermal runaway event in a battery module is illustrated, in accordance with various embodiments. The method 1300 may comprise receiving, via a thermal management strip, an excess heat from a cell entering thermal runaway (step 1302). The thermal management strip may be in accordance with any thermal management disclosed herein. In various embodiments, the excess heat may be received from a side of a cylindrical cell, a pouch cell, or the like. The excess heat may be received by a thermally conductive layer disposed between a first insulation layer and a second insulation layer of the thermal management strip.

In various embodiments, the method 1300 further comprises apportioning, via the thermal management strip, the excess heat among a plurality of cells (step 1304). The plurality of cells may include the cell entering thermal runaway. The thermal management strip may be in contact with each cell in the plurality of cells. The plurality of cells may be a portion of cells in a battery module. The apportioning the excess heat may result in each cell in the plurality of cells increasing in temperature, while maintaining a temperature below a thermal runaway threshold. In this regard, by apportioning the excess heat among the plurality of cells, a cascading of cells entering thermal runaway may be prevented from cells immediately adjacent to the cell entering thermal runaway.

A thermal management strip assembly is disclosed herein. The thermal management strip assembly may comprise: a first thermal management strip having a first slot, the first thermal management strip comprising: a first insulating layer; a second insulating layer; a first thermally conductive layer disposed between the first insulating layer and the second insulating layer; a second thermal management strip having a second slot coupled to the first slot, the second thermal management strip comprising: a third insulating layer; a fourth insulating layer; a second thermally conductive layer disposed between the third insulating layer and the fourth insulating layer, the second thermally conductive layer being in contact with the first thermally conductive layer.

A battery module is disclosed herein. The battery module may comprise: a cell-brick assembly comprising: a first plurality of cells forming a first row of cells in the cell-brick assembly; and a first thermal management strip disposed in the first row of cells.

In various embodiments, the cell-brick assembly may further comprise: a second plurality of cells forming a second row of cells in the cell-brick assembly, the second row of cells being adjacent to the first row of cells; and a second thermal management strip disposed in the second row of cells. The first thermal management strip and the second thermal management strip may each comprise a thermally conductive layer, a first insulating layer, and a second insulating layer, the thermally conductive layer being disposed between the first insulating layer and the second insulating layer. The first thermal management strip may be in contact with a portion of each cell in the first plurality of cells, and wherein the second thermal management strip is in contact with a portion of each cell in the second plurality of cells. The battery module may further comprise a thermally conductive component coupled to the first thermal management strip and the second thermal management strip. The thermally conductive component is coupled to a first thermally conductive layer of the first thermal management strip and a second thermally conductive layer of the second thermal management strip. The battery module may further comprise a heating device, the heating device being coupled to the first thermal management strip and the second thermal management strip. The first thermal management strip may be in contact with a first side of a first cell in the first plurality of cells, a second side of a second cell in the first plurality of cells, the second side being opposite the first side and the second cell being adjacent to the first cell.

In another embodiment, a thermal management method comprises insulating a first cell, of a plurality of cells, from adjacent cells, of the plurality of cells, that are adjacent the first cell, and conducting/apportioning heat from the first cell, that passes from the first cell through the insulation, to non-adjacent cells of the plurality of cells.

Although described herein in connection with rows, columns, and diagonals, and serpentine paths and straight paths of thermal management strips, any suitable paths, shapes, orientations, and arrangements of the thermal management strips may be used.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. An assembly comprising:
a first cell;
a second cell adjacent to the first cell;
a third cell adjacent to the second cell; and
a thermal management strip contacting a first portion of the first cell, a second portion of the second cell, and a third portion of the third cell, wherein the thermal management strip comprises a thermally conductive layer, a first insulating layer, and a second insulating layer, the thermally conductive layer being disposed between the first insulating layer and the second insulating layer.

2. The assembly of claim 1, wherein the thermal management strip is in contact with a thermally conductive material, the thermally conductive material being adjacent to the first cell.

3. The assembly of claim 1, wherein the first portion of the first cell is a first side portion of the first cell, wherein the second portion of the second cell is a second side portion of the second cell, and wherein the third portion of the third cell is a third side portion of the third cell.

4. The assembly of claim 1, wherein the thermal management strip is in contact with the first cell, the second cell, and the third cell in a pattern shape selected from a group consisting of a serpentine shape, a linear shape, a grid shape, and a honeycomb shape.

5. The assembly of claim 4, wherein the pattern shape is the serpentine shape.

6. A battery module comprising:
a first plurality of cells forming a first row of the battery module;
a second plurality of cells forming a second row of the battery module;

a plurality of insulative wraps, each wrap in the plurality of insulative wraps disposed around a respective cell in the first plurality of cells and the second plurality of cells; and a plurality of conductive thermal management strips, a first conductive thermal management strip in the plurality of conductive thermal management strips in contact with a first portion of insulative wraps in the battery module, the first conductive thermal management strip configured to apportion heat among a first portion of cells corresponding to the first portion of insulative wraps in response to a cell in the first portion of cells entering thermal runaway.

7. The battery module of claim 6, wherein the plurality of conductive thermal management strips form a honeycomb support structure.

8. The battery module of claim 6, further comprising a thermally conductive component coupled to the plurality of conductive thermal management strips.

9. A battery module, comprising:
 a plurality of cells; and
 a plurality of thermal management strips, each thermal management strip in the plurality of thermal management strips thermally coupled to a respective portion of cells in the plurality of cells, wherein:
  each thermal management strip in the plurality of thermal management strips is configured to apportion heat among the respective portion of cells in the plurality of cells when a cell in the respective portion of cells enters a thermal runaway event, and
  apportioning excess heat among the respective portion of cells in the plurality of cells results in each cell in the respective portion of cells increasing in temperature, while maintaining a temperature below a thermal runaway threshold.

10. The battery module of claim 9, wherein the plurality of thermal management strips form a honeycomb support structure configured to structurally support the plurality of cells.

11. The battery module of claim 9, wherein each cell in the plurality of cells is a cylindrical cell.

12. The battery module of claim 11, wherein an outer radial surface of each cell in the plurality of cells is coupled to at least one thermal management strip in the plurality of thermal management strips.

13. The battery module of claim 12, wherein the outer radial surface of each cell in the plurality of cells is coupled to the at least one thermal management strip in the plurality of thermal management strips via an adhesive.

14. The battery module of claim 9, wherein each thermal management strip in the plurality of thermal management strips comprises a thermally conductive layer, a first insulating layer, and a second insulating layer, the thermally conductive layer being disposed between the first insulating layer and the second insulating layer.

15. The battery module of claim 9, further comprising a heating device coupled to the plurality of thermal management strips.

* * * * *